United States Patent [19]

Osada et al.

[11] 4,346,747
[45] Aug. 31, 1982

[54] RUN-FLAT SUPPORT AND TIRE ASSEMBLY

[75] Inventors: Isao Osada, Izumi; Shoichi Sano, Tokorozawa, both of Japan

[73] Assignees: Ohtsu Tire & Rubber Co., Ltd., Osaka; Honda Giken Kogyo Kabushiki Kaisha, Tokyo, both of Japan

[21] Appl. No.: 183,561

[22] Filed: Aug. 29, 1980

Related U.S. Application Data

[63] Continuation of Ser. No. 2,749, Jan. 11, 1979, abandoned.

[30] Foreign Application Priority Data

Jan. 19, 1978 [JP] Japan ................................. 53-4582

[51] Int. Cl.³ ............................................. B60C 17/04
[52] U.S. Cl. .............................. 152/158; 152/330 RF; 152/330 L; 152/400
[58] Field of Search ............. 152/158, 330 RF, 330 L, 152/400, 401

[56] References Cited

U.S. PATENT DOCUMENTS

| 3,638,701 | 2/1972 | Rossler et al. | 152/158 |
| 3,872,907 | 3/1975 | Curtiss, Jr. et al. | 152/158 |
| 4,051,885 | 10/1977 | French et al. | 152/158 |
| 4,163,466 | 8/1979 | Watts | 152/158 |

FOREIGN PATENT DOCUMENTS

| 1176013 | 8/1964 | Fed. Rep. of Germany | 152/158 |
| 1680400 | 7/1970 | Fed. Rep. of Germany | 152/158 |
| 2100965 | 7/1972 | Fed. Rep. of Germany | 152/158 |
| 836738 | 1/1939 | France | 152/158 |

Primary Examiner—Edward C. Kimlin
Assistant Examiner—Lois E. Boland
Attorney, Agent, or Firm—Armstrong, Nikaido, Marmelstein, & Kubovcik

[57] ABSTRACT

A run-flat support and tire assembly designed so that when air sealed within a tire is lost, the vehicle may be supported by support members in place of air pressure within the tire. The run-flat tire has a split rim, a tubeless tire mounted on the rim, and a plurality of annularly disposed circular support members. The support members each comprises a thin-wall casing body having lattice-like reinforcing ribs for partitioning the interior of the casing body into a plurality of chambers. Connecting protrusions project from the casing body. The connecting protrusions are detachably connected to one another for each incorporation of the support members into the tire.

5 Claims, 6 Drawing Figures

RUN-FLAT SUPPORT AND TIRE ASSEMBLY

This is a continuation of application Ser. No. 2,749 filed Jan. 11, 1979, now abandoned.

BACKGROUND OF THE INVENTION

1. Field of the Invention

The present invention relates to a run-flat support and tire assembly which is designed so that when air sealed within a tire is lost due to puncture of the tire or the like, the vehicle may be supported by appropriate support means in place of air pressure within the tire to permit continued traveling of the vehicle without hindrance.

2. Description of the Prior Art

In general, it is extremely dangerous and actually difficult to replace a punctured tire on expressways, congested roads or the like when air sealed in the tire is lost by reason of puncture of tire or for other reasons. Further, even on roads where a punctured tire may be replaced, if the vehicle can travel easily to the nearest repair shop or the like, it is very convenient to a driver to avoid tire repair since he need not to perform troublesome and time-consuming tire replacement.

Under these circumstances, the development of run-flat tires is desirable whereby even in the event the tire is punctured, the vehicle can be used to get to a repair shop or the like, with a minimal damage given to the tire in the punctured state. Various proposals have been made to make run-flat tires in which a run-flat support is employed to support the vehicle in place of air pressure within the tire, when the latter is punctured. However, prior art safety supports have suffered from disadvantages that the run-flat support is complicated in construction and is hard to be incorporated into the tire.

SUMMARY OF THE INVENTION

The present invention overcomes the limitations noted above with respect to prior art by providing a run-flat support and tire assembly which is designed so that when air sealed within a tire is lost due to puncture or the like, the vehicle may be supported by a novel support means in place of air pressure within the tire thus permitting continuous travel of the vehicle.

The invention will be more readily understood from the ensuing description of one embodiment thereof with reference to the accompanying specification, claims and drawings.

DESCRIPTION OF THE PREFERRED EMBODIMENT

Figure 1:
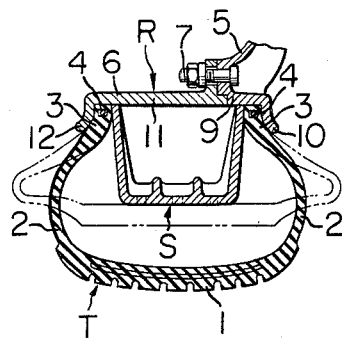
FIG. 1 is a partial longitudinal sectional view of a run-flat support and tire assembly in accordance with the present invention.
Figure 2:
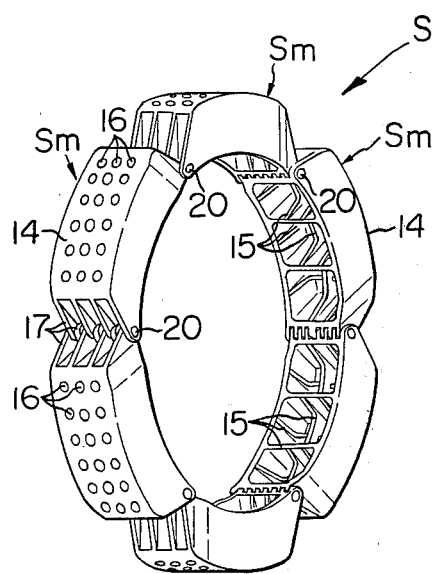
FIG. 2 is a perspective view of a run-flat support view showing a plurality of support members annularly connected.
Figure 3:
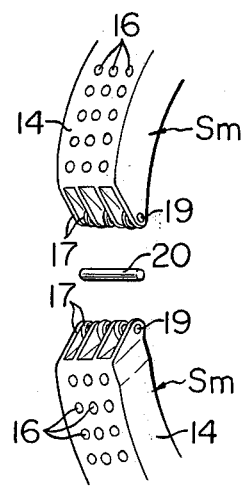
FIG. 3 is an exploded perspective view showing a main part of the support member.

Referring now to FIG. 1, there is shown a part of a run-flat support and tire assembly of the present invention in longitudinal section. The assembly comprises a tubeless tire (hereinafter referred to as "tire") T, a split rim R and a run-flat support S, which will be described in order.

First, the tire T is constructed in the usual manner. A tread portion 1 has side walls, 2, 2 integrally extended to right and left thereof, and bead portions 3, 3, which gradually increases in wall thickness and are integrally extended from the side wall portions 2, 2. The bead portions 3, 3 have bead wires 4, respectively, embedded therein.

Next, the split rim R is constructed such that an outboard rim 5 is joined with an inboard rim 6. The outboard rim 5 and the inboard rim 6 being integrally connected by a plurality of connecting bolts 7, 7 . . . (only one of which is shown in FIG. 1). The outboard rim 5 has a narrow rim base 9 and a rim flange 10 extending towards an outer end thereof to hold one bead portion 3 of the tire T, and the inboard rim 6 has a wide rim base 11 and a rim flange 12 similarly extended towards an outer end thereof to hold the other bead portion 3 of the tire T. The rim bases 9 and 11 cooperate with each other to form a flat cylindrical supporting surface of the split rim R to support an inner peripheral surface of the support S.

Figure 4A:
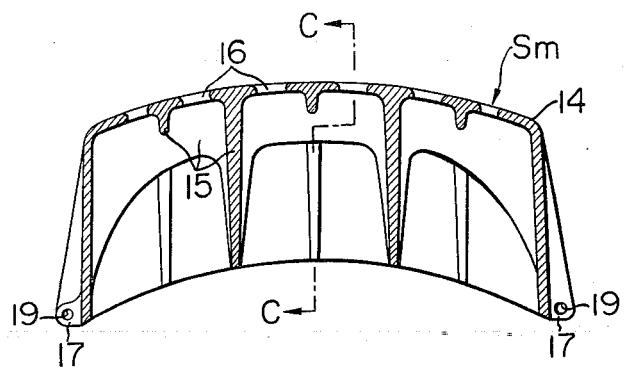
FIG. 4A is a longitudinal side view of the support member.
Figure 4B:
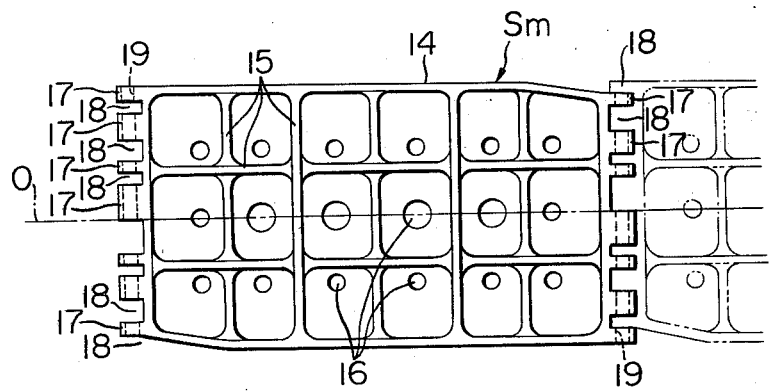
FIG. 4B is a bottom view.
Figure 4C:
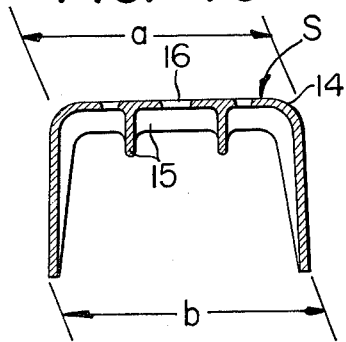
FIG. 4C being a sectional view taken on line C—C of FIG. 4A.

The run-flat support S comprises a plurality of support members Sm which are annularly disposed to be fitted along the entire peripheral surface of the rim base of the split rim R. Each support member Sm is formed into a circular configuration which is substantially concentric with the sectional rim R and principally comprises a thin-wall casing body 14 whose inner peripheral surface is open, the casing body having its height about half of the side wall portion 2 of the tire T. The support element Sm is in the form of a trapezoid in cross section so as to have an outer peripheral wall a smaller in lateral width than the opened inner peripheral surface b (FIG. 4C). The inwardly opened construction of the casing body 14 simplifies the production and inspection thereof, enabling the configuration of the internal ribs and the thickness of various parts of the casing body to be varied in compliance with load distribution requirement and to thereby provide a support member which has balanced strength, rigidity and is highly durable under tire-puncture conditions. The casing body 14 is reinforced by lattice-like reinforcing ribs 15 which divide the interior of the casing body into a plurality of chambers. The casing body 14 is formed in its outer peripheral wall with holes 16, through which the plurality of chambers are brought into communication with the exterior. These holes serve to decrease the weight of the support members and serve as air passageways or the like. The casing body 14 is further formed in its peripheral opposite surfaces with a plurality of connecting protrusions 17, and recesses 18 disposed alternately in a lateral direction. It will be noted that the connecting protrusions 17 and recesses 18 of each of said end surfaces symmetrically positioned about the lateral center line 0 of the end surface are in a male and female relationship, and the connecting protrusions and recesses in the opposite surfaces are in a point symmetrical relationship. With the above construction, the support members Sm are connected with each other by means of connecting protrusions and recesses which are closely engaged with each other in male and female relationship. In addition, assembly of the support members Sm can be effected without any difficulty, because the pins 20 after insertion into the pin holes 19 are securely held against axial movement by the engagement thereof at the opposite ends with the tire bead portions.

Accordingly, when a plurality of support members Sm, of identical configuration are annularly disposed the opposed connecting protrusions 17 and recesses 18 may be engaged with one another, with the sides of the support members Sm aligned in one and the same plane. Thus, connecting pins 20 are inserted into pin holes 19 in the connecting protrusions 17 aligned in row to pivotally connect the support members Sm in an endless relation.

The safety support members Sm are integrally formed of a material such as metal of spring nature and synthetic resin, e.g., nylon containing glass fiber, which is thin in wall thickness, high in strength, and minimal lowering in strength even at high temperatures.

BEST MODE OF INVENTION

A run-flat support and tire assembly comprising a split rim divided into at least two sections in an axial direction of the wheel, said rim having annular flange portions formed on the opposite sides thereof and a base portion formed therebetween, a tubeless tire mounted on said split rim and having annular bead portions formed on the opposite sides thereof, and a plurality of circumferentially divided circular support members each having an inner peripheral surface thereof fitted over said rim base portion within an air chamber surrounded by said tubeless tire and said rim for clampingly holding, in cooperation with said flange portions, said bead portions of said tubeless tire against displacement so that the tread portion of said tire is firmly supported thereby when air sealed within said tire is lost, each of said support members comprising a thin-wall casing body having at its inner peripheral surface, reinforcing ribs in the form of a lattice protruded from the inner surface formed open of said casing body to partition the interior of said casing body into a plurality of chambers, and connecting protrusions projecting from opposite end surfaces circumferentially of said casing body, said connecting protrusions on opposed ends of said plurality of support members being detachably connected to one another.

The assembling procedure of the run-flat support and tire will be described hereinafter. First, a predetermined number of support members Sm, Sm . . . interconnected with each other in a chain-like manner are inserted into the tire T through an inner peripheral opening thereof, the support members are annularly disposed therein and then connected at the disconnected ends by the connecting pins 20 in the manner as previously mentioned. Next, the outboard and inboard rims 5, 6 of the split rim R are incorporated through opposite side surfaces of the tire T and connected by a plurality of connecting bolts 7, then the rim bases 9 and 11 of the rims 5 and 6 are fitted along the inner peripheral surfaces of the support members Sm so that the right and left bead portions 3, 3 of the tire T are firmly held by the both sides of the support members Sm and both of the rim flanges 10, 12 of the split sectional rim R. As a consequence, the bead portions 3, 3 are prevented from axial and circumferential movement with respect to the rim R and the connecting pins 20 are prevented from slipping out. Accordingly, no disconnection of the connected support members Sm occurs even when the wheels are rotating.

A lubricant is sealed into an air chamber surrounded by the tire T and the split rim R so that when the tread portion 1 comes into contact with the outer peripheral surfaces of the safety supports $S_m$ resulting from the puncture of the tire T or the like, the lubricant serves to decrease frictional resistance produced therebetween and to prevent damage thereof and heat generation.

Thus, when the air chamber of the tire T is filled with air of a given pressure to place the tire T in a normal inflated state, the wheel may be supported by the air pressure within the tire T as shown by the solid line in FIG. 1. Conversely, when the air sealed within the tire T is lost due to puncture of the tire T or the like, the tire T deflates and as a result, the tread portion 1 becomes flattened as shown by the dash-dotted contour lines and bears on the outer peripheral surface of the support S, whereby the vehicle may be supported by the support S, in place of air pressure within the tire T. At this time, suitable resiliency due to thin-wall formation and trapezoidal configuration of the casing body 14 (as well as due to lattice-like reinforcing ribs 15) absorbs shock from the road surface. Furthermore, as the load imposed on the casing body increases under the flattened tire condition, the trapezoidal formation of the casing body tends to cause the opened inner periphery of the casing body to expand in the axial or lateral direction of the wheel; to thereby increasingly press the tire bead portions 3 against the rim flanges 10, 12 so as to prevent lateral displacement of the tire bead portions. As a consequence, there can be avoided unfavorable situations such as: unstabilized running of the vehicle due to the tire bead displacement, damage to the rim flanges caused by the collision thereof against protrusions on the road surface, and heat destruction of the tire resulting from frequent movement of the tire bead portions. Moreover, due to the symmetric arrangement of the connecting portions of the casing body, the side surface of the adjacent casing bodies in contact with the tire bead portions, are joined to one another with a limited amount of discontinuity to uniformly distribute the bead-holding forces to further enhance the aforementioned advantages. In this manner, the vehicle may be driven and travelled continuously to the nearest repair shop.

In accordance with the present invention, as described above, there are a plurality of annularly disposed circular support members, in which the inner peripheral surface thereof engages the rim bases of the split rim, the rim bases cooperate with the rim flanges to hold the bead portions of a tubeless tire and when sealed air within the tubeless tire is lost, the tread portion of the tire may be supported by the support members, and the support members have connecting protrusions extending on each opposed end surfaces thereof, the connecting protrusions being detachably connected so that the support members may be incorporated into the tubeless tire in a simple and easy manner.

In addition, the support members are comprised of thin-wall casing bodies reinforced by lattice-like ribs and also serve as the bead stoppers for holding the bead portions of the tire in a given position of the split rim to thereby render the construction simpler and lighter in weight. Therefore it is possible to readily manufacture the support and tire assembly while at the same time minimizing riding discomfort resulting from an increase in weight below the springs of the vehicle.

It will be appreciated that various changes and modifications may be made in the foregoing arrangement and construction without departing from the spirit of the present invention and as many changes may be made in the embodiments herein set forth it being understood that all matter described herein are to be interpreted as illustrative and not in a limiting sense.

What is claimed is:

1. A run-flat support and tire assembly for use with a tubeless tire comprising: a split rim divided into at least two sections in an axial direction of the wheel; annular flange portions of said rim formed on the opposite sides thereof and a base portion formed therebetween; a tubeless tire mounted on said split rim and having annular bead portions formed on the opposite sides thereof; a plurality of circumferentially divided circular support members each having an inner peripheral surface thereof fitted over said base portion within an air chamber surrounded by said tubeless tire and said rim for cooperating with said flange portions to prevent displacement of said bead portions of said tubeless tire and to firmly support the tread portion of said tire when air sealed within said tire is lost; each of said support members comprising a thin-wall casing body having its inner peripheral surface formed open; said support members being further defined as trapezoid in cross section, having a radially outer peripheral wall smaller in lateral width than the opened inner peripheral surface, reinforcing ribs extending from the inner surface of said casing body to partition the interior of said casing body into a plurality of chambers; and connecting protrusions projecting circumferentially from opposite end surfaces of said casing body, said connecting protrusions at the adjacent ends of said support members being closely engaged with each other in male and female relationship and pivotally connected at their inner peripheries with each other by means of a plurality of connecting pins which extend laterally in an axial direction and being clamped between said bead portions of said tubeless tire, each of said support members having a radial height greater than that of said tire bead portions.

2. A run-flat support tire assembly as claimed in claim 1, wherein: said reinforcing ribs are in the form of a lattice.

3. A run-flat support and tire assembly as claimed in claim 1, wherein: said support elements are formed of metallic material of spring nature.

4. A run-flat support and tire assembly as claimed in claim 1, wherein: said support elements are formed of synthetic resin material.

5. A safety wheel apparatus as claimed in claim 1, wherein: said air chamber surrounded by said tire and said rim is provided with a lubricant sealed therein.

* * * * *